United States Patent [19]

Hansford

[11] 3,719,721

[45]*March 6, 1973

[54] DEHYDROGENATIVE PROCESS AND CATALYST

[75] Inventor: Rowland C. Hansford, Yorba Linda, Calif.

[73] Assignee: Union Oil Company of California, Los Angeles, Calif.

[*] Notice: The portion of the term of this patent subsequent to Nov. 25, 1986, has been disclaimed.

[22] Filed: Feb. 26, 1971

[21] Appl. No.: 119,354

Related U.S. Application Data

[63] Continuation-in-part of Ser. No. 844,653, July 24, 1969, abandoned, which is a continuation-in-part of Ser. No. 661,777, Aug. 21, 1967, Pat. No. 3,480,684.

[52] U.S. Cl.............260/673.5 R, 260/683.3, 260/669
[51] Int. Cl..................................................C07c 5/27
[58] Field of Search......260/673.5, 683.3, 683.5, 669

[56] References Cited

UNITED STATES PATENTS

| | | | |
|---|---|---|---|
| 3,480,684 | 11/1969 | Hansford | 260/673.5 |
| 2,337,190 | 10/1959 | Felder | 260/673.5 |
| 3,542,897 | 11/1970 | Wattimena et al. | 260/683.3 |

Primary Examiner—Delbert E. Gantz
Assistant Examiner—J. Nelson
Attorney—Milton W. Lee, Richard C. Hartman, Lannas S. Henderson, Robert E. Strauss and Michael H. Laird

[57] ABSTRACT

Hydrocarbons are dehydrogenated to olefins and/or dehydrocyclized to aromatic hydrocarbons at elevated temperatures in the presence of a catalyst comprising an intimate association of alumina and chromium oxide upon which is deposited a minor proportion of a promoter selected from the oxides of niobium and tantalum. The catalyst preferably also contains a minor porportion of an alkali and/or alkaline earth metal oxide.

20 Claims, No Drawings

DEHYDROGENATIVE PROCESS AND CATALYST

This application is a Continuation-in-Part of my copending application, Ser. No. 844,653, filed July 24, 1969, now abandoned, which was a Continuation-in-Part of Ser. No. 661,777, now U.S. Pat. No. 3,480,684, issued Nov. 25, 1969.

BACKGROUND AND SUMMARY OF THE INVENTION

It is well known that paraffin hydrocarbons containing six or more carbon atoms can be converted to aromatic hydrocarbons by heating at high temperatures and low pressures. However, the thermal conversion is highly inefficient due to competing reactions of cracking and the polymerization of unsaturated intermediates, leading respectively to the production of large amounts of gaseous hydrocarbons and heavy polymers. It is reported that a more selective conversion can be obtained by the use of Group VI–B metal oxide catalysts supported on alumina (U.S. Pat. No. RE 21,486). Data reported herein shows however that these catalysts have a relatively low activity. Moreover, they tend to become rapidly deactivated by coke-like deposits arising from the polymerization of olefinic intermediates and/or the condensation of olefins with aromatic hydrocarbons.

However, alumina contains active surface acidity which tends to promote the isomerization of n-paraffins to isoparaffins. Upon dehydrogenation iso-paraffins yield unsaturated hydrocarbons which tend to polymerize rather than cyclize, and which can also condense with aromatic hydrocarbons to produce polycyclic aromatics, all resulting ultimately in the formation of coke. The surface acidity of the alumina also tends to promote cracking with resultant production of gaseous hydrocarbons. Attempts have previously been made to reduce the amount of hydrocracking and isomerization by adding alkali metal oxides to alumina-based catalysts to thereby reduce their surface acidity, but these attempts have heretofore been only partially successful, and the resulting catalysts are still deficient in intrinsic activity.

In U.S. Pat. No. 2,337,190, an improved alkali metal-inhibited, chromia-alumina dehydrocyclization catalyst is disclosed, containing a cerium oxide promoter. The present invention is based upon my discovery that the oxides of niobium (columbium) and/or tantalum constitute even more effective promoters for chromia-alumina catalysts than the cerium oxide promoter of said patent. Thus, the promoted catalysts of this invention are found to be not only more active for dehydrogenation and dehydrocyclization than the cerium oxide-promoted catalysts, but in most cases they are more selective, giving higher yields of desired olefins and/or aromatic hydrocarbons and lower yields of coke and light gases. As observed above, it is generally recognized that dehydrocyclization proceeds through the intermediate dehydrogenated species and that many of the disadvantages associated with prior art dehydrocyclization systems are the result of side reactions involving those intermediate radicals and unsaturates. As the systems herein described are much less subject to those disadvantages, i.e., the side reaction of olefinic intermediates, it is apparent that they can be employed for the production of olefinically unsaturated hydrocarbons by simply terminating the process at that point rather than enabling the continuation of the reaction to the point at which dehydrocyclization occurs. The nature of the parameters that govern the product distribution in this regard, i.e., the relative respective proportions of olefinic product as opposed to dehydrocyclized aromatic or cyclic olefinic products are readily apparent from prior art knowledge of dehydrocyclization systems. For example, it is generally known that the conversion of aliphatic hydrocarbons to aromatic products is favored at lower temperatures and low space velocities, whereas the formation of olefinic products is favored at higher temperatures due primarily to equilibrium considerations. However, it is also generally known that as reaction temperatures are elevated, as would be preferred to favor the production of olefinic product, the tendency toward thermal and catalytic cracking becomes more prevalent. Consequently when the systems of this invention are employed to produce olefins, as opposed to aromatics, by operating at higher temperatures, it is advisable to reduce the overall contact time to avoid cracking of the reactants or products. As these distinctions between simple dehydrogenation and dehydrocyclizations systems are fairly well appreciated by the prior art, the conditions necessary to favor the production of olefinic products are readily ascertainable.

CATALYST DETAILS

The alumina base employed herein may comprise any of the well known activated aluminas of commerce, or described in the literature. Suitable activated aluminas, include, for example, gamma alumina, eta alumina, kappa alumina, theta alumina, etc., as well as calcined crude aluminas such as bauxite. Suitable activated aluminas, normally in the gamma form, may be prepared by conventional methods of precipitation of aluminum hydroxide from solutions of aluminum salts with bases such as ammonium hydroxide, followed by washing, drying and calcining to activate the precipitated gels. It is preferred to employ aluminas having a surface area in the range of about 100 to 400 square meters per gram.

The active components of the catalyst may be added to the alumina base in any desired order, and by conventional methods known in the art. Suitable methods include, for example, impregnation with aqueous solutions of salts of the desired metals; coprecipitation of alumina gel along with any one or more hydrous oxides or hydroxides of the remaining desired metals, followed by impregnation with salt solutions of any remaining desired metals; separate precipitation of the hydrogels of alumina, chromia, and an oxide or hydroxide of niobium and/or tantalum, followed by intimate mixing of the resulting slurries, the alkali inhibitor being added by impregnation after calcining of the composited gels, or by any such similar methods. When alkali metal oxide inhibitors are employed, it is preferred that they be added by a final impregnation step so as to avoid leaching out soluble metal hydroxides during subsequent impregnation and/or co-slurrying steps. But the insoluble hydroxides of the alkaline earth metals may be added at any convenient stage in the manufacture. Grinding or ball milling of powdered alumina and chromia may be utilized in some cases, followed by impregnation with salts of niobium and/or tantalum and with salts of the desired alkali metals and/or alkaline earth metals. It will be understood that any method of compositing the desired components is contemplated which gives a sufficiently intimate and homogeneous admixture.

The active metal oxides (i.e., the oxides of chromium, niobium and/or tantalum, alkali metal and/or alkaline earth metal) are preferably derived from water soluble salts of the respective metals with readily decomposable anions such as nitrate, acetate, oxalate or the like. This is especially desirable when the active metal or metals are added by impregnation (which precludes the removal of undesired anions by water washing). It will be understood that the preferred salts of decomposable anions are converted to the corresponding metal oxides upon final calcination of the catalyst composite in air.

Following the final addition of active components, the wet composite is ordinarily drained, dried at relatively low temperatures, and calcined in air at temperatures of about 700°–1400°F. Normally, the catalyst is employed in the form of pellets or granules of substantially uniform size, ranging between about 1/16 inches and ⅜ inch diameter. The pelleting may be carried out at any desired stage of the manufacture prior to the final calcining step. In some cases, the catalyst may be employed in a powder form. The finished catalysts normally will fall within the following composition ranges:

TABLE I

| | Weight-Percent | |
|---|---|---|
| | Broad Range | Preferred Range |
| $Al_2O_3$ | 30–95 | 50–85 |
| $Cr_2O_3$ | 1–50 | 10–40 |
| $Nb_2O_5$ | 0.1–10 | 1–5 |
| $Ta_2O_5$ | | |
| Alkali metal, Alkaline earth metal oxides | 0.5–15 | 2.–10 |

The preferred alkaline inhibitors comprise the oxides of potassium, rubidium, calcium, and strontium, in that they yield catalysts of higher apparent activity than do the remaining alkali metal and alkaline earth metal oxides. The oxides of rubidium and strontium are additionally preferred because they appear to give better selectivity of conversion.

Specifically contemplated exemplary catalyst compositions are as follows:

TABLE 2

| Catalyst No. | $Al_2O_3$ | $Cr_2O_3$ | Weight-Percent Promoter | Inhibitor |
|---|---|---|---|---|
| 1 | 73 | 20 | 2($Nb_2O_5$) | 5($Rb_2O$) |
| 2 | 79.5 | 10 | 1.5($Nb_2O_5$) | 8(CaO) |
| 3 | 67.5 | 25 | 2.5($Nb_2O_5$) | 5($K_2O$) |
| 4 | 52.5 | 40 | 3.5($Nb_2O_5$) | 4(SrO) |
| 5 | 64.5 | 25 | 2.5($Nb_2O_5$) | 8(BaO) |
| 6 | 67.5 | 25 | 2.5($Nb_2O_5$) 2.5($Rb_2O$) | 2.5(CaO) |
| 7 | 67 | 25 | 3 ($Ta_2O_5$) | 5($K_2O$) |
| 8 | 69 | 25 | 3($Ta_2O_5$) | 3($Li_2O$) |
| 9 | 68 | 25 | 3($Ta_2O_5$) | 4($Na_2O$) |
| 10 | 67.5 | 25 | 1.5($Nb_2O_5$) 1-$Ta_2O_5$) | 5(SrO) |

Feedstocks

The characteristics of the feedstock employed in any particular situation will, of course, depend largely upon the nature of the product desired. For example, a wide range of hydrocarbon feeds can be employed when the objective is generally to increase the carbon-to-hydrogen ratio of the hydrocarbon stock as is the case in the production of certain fuels. In systems designed to accomplish this broad objective, certain constituents of the feed may simply be dehydrogenated to the corresponding olefins, di-olefins, etc., while others may be dehydrogenated and cyclized to substituted and unsubstituted cyclic olefins and aromatics. Such processes can employ cyclic and acyclic aliphatic, alkaryl and aralkyl dehydrogenateable hydrocarbons having at least two and up to about 30, and generally about two to about 20, and preferably two to about 12 carbon atoms per molecule.

The application of these systems to the conversion of relatively lower boiling feeds is generally more efficient due to the susceptibility of higher molecular weight feeds to cracking. For example, these catalysts can be used to dehydrogenate heavier hydrocarbons such as light paraffin waxes. However, the higher the molecular weight of the feed, the more difficult it becomes to prevent undesired cracking. Consequently, such feeds should be converted at low pressures, e.g., less than about 50 psig and in the presence of minor amounts of hydrogen. In these situations a balance of objectives is required since excessive hydrogen will inhibit the activity of the catalyst. Hence, it is usually not desirable to employ hydrogen levels in excess of about 100 psia partial pressure.

The dehydrogenation of aliphatic substituents on aromatic nuclei can also be accomplished by these procedures. Therefore, as a general rule, any hydrocarbon having a paraffinic linkage with at least one carbon-to-carbon single bond between primary and/or secondary carbon atoms can be dehydrogenated to form an unsaturated analog by contacting with the catalysts of this invention under dehydrogenation conditions.

A characteristic common to all feeds employed in this process is that they contain a substantial amount of at least one dehydrogenateable hydrocarbon. This classification for the purpose of this invention includes hydrocarbons convertable to olefins by direct dehydrogenation as well as acyclic hydrocarbons convertable to substituted and/or unsubstituted cyclic products by at least partial dehydrogenation and cyclization. As a general rule all of these reactants will have at least two paraffinically linked primary and/or secondary carbon atoms each of which in turn is bonded to at least one hydrogen atom. Obviously these hydrocarbons can be converted to dehydrogenated products, e.g., olefins, cyclics, aromatics, etc., in the presence of a wide variety of other reactive or nonreactive materials. For example, it may be desirable in some applications to employ these methods in the reaction of a feed containing less than one volume percent dehydrogenateable hydrocarbons, although most feeds will contain at least about 5 volume percent of these dehydrogenateable materials.

These catalysts are particularly attractive for the production of lower olefins from the corresponding alkanes in view of the demand for the resultant olefin products. Conversions of this type represent substantial up-grading of the lower alkane hydrocarbon feeds. The most attractive precursors in this regard are the paraffins, preferably normal paraffins, having from two to about five carbon atoms per molecule.

When the primary objective is the production of aromatic hydrocarbons, the choice of feedstocks is necessarily somewhat more limited in that the feed preferably contains a substantial proportion of hydrocarbons containing at least six aliphatically linked carbon atoms. The preferred feedstocks encompass those containing a substantial amount of paraffinic hydrocarbons containing at least six carbon atoms in a straight chain and having a total of about six to about 12 carbon atoms per molecule. For practical purposes, however, it is preferred to utilize substantially pure normal paraffin feeds, e.g., n-hexane, n-heptane, n-octane, n-decane, etc. Benzene is produced in good yields from n-hexane; toluene from n-heptane, and xylenes from substantially any octane isomer containing at least six carbon atoms in a straight chain. In any case, however, it is preferred to employ feedstocks which contain a minimum of iso-paraffins. Exemplary feeds include ethane, n-butane, iso-octane, undodecane, cyclohexane, cyclohexene, 3-propyltoluene, n-pentyl benzene, tetralin, n-butyl benzene, 3-hexenyl-1-toluene, 2-pentenyl-2-cyclohexene, gas oils, light paraffin waxes, reformer feeds, cracked distillates, and the like.

Process Conditions

The process is normally carried out in conventional fashion by passing the vaporized and preheated feed through a bed of the catalyst. Interstage heating is ordinarily desirable, since the reaction is highly endothermic. A problem of some moment in achieving maximum efficiency in the process resides in the choice of whether added hydrogen is to be employed in the contacting, and if so, the choice of a suitable hydrogen partial pressure to be maintained. It has been found that the activity of these catalysts is somewhat repressed by hydrogen. On the other hand, if hydrogen is not employed the catalyst deactivation rate is generally increased. In any case, hydrogen pressures in excess of about 100 psia are undesirable in that they tend thermodynamically to repress the reaction. These considerations lead to the conclusions that if maximum catalyst activity is the paramount economic consideration the process should be carried out without added hydrogen. However, if economic considerations dictate that the advantage of a longer run length outweighs some sacrifice in catalyst activity, sufficient hydrogen should be used to maintain minimal partial pressures thereof of about 15 to 80 psi. In many cases hydrogen partial pressures within these ranges represent an optimum comprise between maximum activity and maximum run lengths between catalyst regenerations.

In summary, the contemplated major process conditions are as follows:

TABLE 3

| | Broad Range | Preferred Range |
|---|---|---|
| Temperature, °F. | 800–1200 | 850–1050 |
| Pressure, psia | 15–200 | 30–100 |
| H/Feed Mole-Ratio | 0–30 | 1–10 |
| Contact Time, Sec. | 0.01–50 | 0.05–2 |
| LHSV (Vol. Liquid Feed/Vol. Catalyst/Hr.) | 0.1–100 | 0.5–10 |
| Vol. % Conversion/Pass | 10–80 | 20–60 |

These conditions encompass and prescribe those generally preferred for dehydrocyclization and for dehydrogenation, particularly dehydrogenation of lower alkyl feeds, i.e., aliphatic hydrocarbons having from about two to about five carbon atoms per molecule. When simple dehydrogenation as opposed to dehydrocyclization is the paramount objective when operating on feedstocks having more than six carbon atoms per molecule, it is generally preferred to effect dehydrogenation at the higher temperatures and shorter contact times which tend to favor dehydrogenation over dehydrocyclization. Although some sacrifice in reaction rate and conversion level per pass is realized by such procedure, the less severe operating conditions result in considerably higher selectivity to dehydrogenated non-aromatic products and minimize cracking of feed and products. As a result of these observations the conditions presently preferred for the simple dehydrogenation of non-aromatic substituents include temperatures within the range of about 900° to about 1200°F. and contact times of less than about 30 seconds, preferably about 0.1 to about 2 seconds. The contact time provided when dehydrogenation is preferred should be only sufficient to approach the equilibrium concentration of dehydrogenated product at reaction temperature. Further exposure of the feed and reactants results only in cracking or further conversion of the product.

The following examples are cited to illustrate the invention and the results obtainable, but are not to be construed as limiting in scope:

EXAMPLE I

An unpromoted chromia-alumina catalyst was prepared as follows:

Alumina hydrogel was precipitated from a solution of 1,030 g. of $Al(NO_3)_3 \cdot 9H_2O$ dissolved in 2,000 ml. of water by the addition of an ammonia solution prepared by diluting 940 ml. of concentrated (28 percent) ammonia with 3,020 ml. of water. The final pH was 9.7.

Chromia hydrogel was similarly precipitated from a solution of 316 g. of $Cr(NO_3)_3 \cdot 9H_2O$ dissolved in 900 ml. of water by the addition of an ammonia solution prepared by diluting 295 ml. of 28 percent ammonia with 1,300 ml. of water. The final pH was also 9.7.

The two hydrogel slurries were thoroughly mixed with a high-speed stirrer to from a homogeneous mixture. This was filtered and washed to remove soluble salt. The washed filter-cake was dried at 220°F. for 6 hours, granulated, and calcined 2 hours at 1,112°F. The surface area (BET method) was 209 square meters per gram. The nominal composition was 70 percent $Al_2O_3 \cdot$ 30 percent $Cr_2O_3$ (by weight).

EXAMPLE II

By the identical method described in Example I, a mixed hydrogel was prepared to give a final product having a nominal composition of 70 percent $Al_2O_3 \cdot 27.5$ percent $Cr_2O_3 \cdot 2.5$ percent $Nb_2O_5$. The source of the niobium oxide was the oxalate and it was coprecipitated with the chromia hydrogel by ammonia before mixing with the alumina hydrogel. The surface area of this preparation after calcination at 1,112°F. was 240 square meters per gram.

EXAMPLE III

Alkali or alkaline-earth metal oxides were added to the dried (not calcined) mixed hydrogels of Examples I and II by soaking in an aqueous solution of the appropriate nitrate, drying and calcining at 1,000°F. for 12 hours. In all cases enough nitrate was impregnated into the combined dried hydrogels to give 5 weight-percent of the corresponding oxide, based on the total composite including the alumina.

EXAMPLE IV

The catalysts prepared as described above were evaluated in a micro-reactor to which was attached a gas chromatograph for analyzing the product stream. A carrier gas (helium) was passed into a packed vessel containing liquid n-heptane thermostated at 20°C. From the saturator the stream of carrier gas plus n-heptane vapor was passed through a preheater and into the reactor at a rate of 50 ml. per minute, giving a liquid hourly space velocity of about 0.75 volumes of liquid n-heptane per volume of catalyst per hour, and a contact time of about 0.5 seconds or less. Conversions and yields were determined at three different temperature levels for each catalyst and conversion-temperature curves were plotted in each case, and from the resulting curves the temperatures required for 25 and 50 percent conversion were picked off and tabulated as follows:

TABLE 4

| Catalyst | Composition, wt. percent | Temp., °F. For 25% conversion [a] | Temp., °F. For 50% conversion [a] | Selectivity to toluene [b] at (—) percent conversion |
|---|---|---|---|---|
| A (Ex. I) | 70% $Al_2O_3$–30% $Cr_2O_3$ | 999 | 1053 | 71 (48) |
| B (Ex. III) | Cat. A plus 5% $K_2O$ | 950 | 988 | 85 (48) |
| C (Ex. II) | 70% $Al_2O_3$–27.5% $Cr_2O_3$–2.5% $Nb_2O_5$ | 847 | 1008 | 64 (42) |
| D (Ex. III) | Cat. C plus 5% $K_2O$ | 862 | 919 | 76 (50) |
| E (Ex. III) | Cat. C plus 5% $Rb_2O$ | 864 | 930 | 87 (62) |
| F (Ex. III) | Cat. C plus 5% CaO | 851 | 910 | 75 (51) |
| G (Ex. III) | Cat. C plus 5% SrO | 838 | 912 | 83 (49) |
| H (Ex. III) | Cat. C plus 5% BaO | 873 | 925 | 74 (40) |
| I (Ex. V) | 81.5 $Al_2O_3$–16% $Cr_2O_3$–1.5% $K_2O$–1% $CeO_2$ | 900 | 937 | 72 |

[a] Conversion=disappearance of n-heptane to all products.
[b] Percent of feed converted which went to toluene.

From the foregoing data it is evident that small amounts of niobium oxide promote the activity of chromia-alumina catalysts for the dehydrocyclization of n-paraffins, lowering the temperature required for 50 percent conversion by about 45°F. (Compare catalysts A vs C.) A similar promotional effect is obtained by using mole-equivalent proportions of tantalum oxide.

It is evident also that small amounts of alkali or alkaline earth metal oxides improve activity and selectivity of the catalysts. (Compare catalyst A vs B; also catalysts D through H vs catalyst C.) It is also apparent that the oxides of rubidium and strontium are most effective in respect to selectivity, while calcium, strontium and potassium give the highest overall activity.

EXAMPLE V

A cerium oxide-promoted chromia-alumina catalyst analogous to those described in U.S. Pat. No. 2,337,190 was prepared as follows: Activated 14–40 mesh alumina was soaked in aqueous chromic acid, dried at 220°F. for 4–5 hours, then again soaked in an aqueous solution of cerium and potassium nitrates, again dried and finally calcined at 932°F. The resulting catalyst analyzed 81.5 percent $Al_2O_3$–16 percent $Cr_2O_3$–1.5 percent $K_2O$–1.0 percent $CeO_2$ by weight.

On testing this catalyst for the dehydrocyclization of n-heptane under conditions described in Example IV, it was found that a temperature of 900°F. was required for 25 percent conversion, and 937°F. for 50 percent conversion. The selectivity of conversion was 72 percent. Thus, the cerium oxide-promoted catalyst is less active than the niobium-promoted catalysts of the present invention. The superiority of the niobium-promoted catalysts becomes even more apparent when they are prepared by impregnation methods.

Examples VI and VII illustrate the best presently contemplated mode of dehydrogenating aliphatic and cycloaliphatic feedstocks to produce olefins.

EXAMPLE VI

A promoted alumina catalyst suitable for the dehydrogenation illustrated in these examples can be prepared by admixing a precipitated alumina hydrogel with a cogel of chromia and niobia ($Nb_2O_5$) having a composition of 70 percent $Al_2O_3$·27.5 percent $Cr_2O_3$·2.5 percent $Nb_2O_5$ by the procedures described in Examples I and II. The catalyst is conveniently activated by drying at a temperature of 220°F. for 6 hours, granulating and calcining in air at a temperature of 1,100°F. for 2 hours.

Pure butane is then passed over a fixed bed of the catalyst in vapor phase at a temperature of 1,100°F., a total pressure of 16 psia, at a contact time of 0.5 seconds to effect conversion of a substantial proportion of the normal butane to butenes and hydrogen. Unconverted butane can be separated from the product and recycled over the catalyst.

EXAMPLE VII

A blend of normal and branched chain alkane and monoolefinic hydrocarbons having 10 to 14 carbon atoms and containing about 10 volume percent olefins is passed in vapor phase over a fixed bed of the catalyst described in Example VI at a temperature of 1,000°F. under a total pressure of 20 psia for a contact time of 0.4 seconds to produce mono- and poly-olefins. Unconverted hydrocarbons can be separated from the olefinic product and hydrogen, and recycled to the catalyst.

EXAMPLE VIII

Cyclohexane can be converted to unsaturated products including benzene, and by contacting with the catalyst described in Example VI at a temperature of 950°F. under a total pressure of 18 psia for a period of 0.8 seconds. As in Example VII unconverted hydrocarbons can be separated from the reaction products and recycled to the reaction zone.

EXAMPLE IX

Unsaturated derivatives of n-butyl cyclohexane including n-butyl benzene and n-butenyl-1-benzene can be produced by contacting the reactant with the catalyst described in Example VI at a temperature of 1,050°F. under a total pressure of 17 psia for a period of 0.5 seconds. Hydrocarbon reactants converted to a lesser degree than desired can be recycled to the reaction zone.

EXAMPLE X

Naphthalene can be produced by dehydrogenating tetralin in the presence of the catalyst described in Example VI under a total pressure of 20 psia for a period of about 0.6 seconds at a temperature of about 1,050°F.

EXAMPLE XI

Unsaturated analogs of n-butyl benzene including n-butenyl-1-benzene and n-butenyl-2-benzene can be produced by contacting the reactant hydrocarbon with the catalyst described in Example VI for a period of 0.8 seconds under a total system pressure of 50 psia and at a temperature of 980°F.

EXAMPLE XII

A distillate gas oil boiling between 500° and 760°F. containing 10 volume percent olefins and 18 volume percent aromatic substituents can be dehydrogenated in the presence of the catalyst described in Example VI under a total system pressure of 100 psia, a hydrogen partial pressure of 40 psi at a temperature of 960°F. for a period of 0.6 seconds.

It is not intended that the invention should be limited to the details described above, since many variations may be made by those skilled in the art without departing from the scope and spirit of the following claims:

I claim:

1. The method of dehydrogenatively reacting at least one hydrocarbon having at least two adjacent paraffinically linked primary and/or secondary carbon atoms in the presence of a catalytic admixture of alumina, a minor proportion of chromium oxide, and a promoting amount of at least one of niobium oxide and tantalum oxide under dehydrogenative conditions of temperature, pressure, and contact time sufficient to increase the carbon-to-hydrogen ratio of said hydrocarbons.

2. The method of claim 1 wherein said hydrocarbons are dehydrogenatively reacted in the presence of said catalytic admixture at a temperature of about 800° to about 1,200°F. sufficient to increase the carbon-to-hydrogen mole ratio of said hydrocarbons.

3. The method of claim 1 wherein said alumina constitutes about 30 to about 95 weight-percent and said chromium oxide constitutes about 1 to about 50 weight-percent of said catalyst.

4. The method of claim 1 wherein said hydrocarbon comprises primarily compounds having about two to about 20 carbon atoms per molecule and is contacted with said catalytic admixture at a temperature of about 800° to about 1,200°F. and said catalytic admixture consists essentially of about 30 to about 95 weight-percent alumina, about 1 to about 50 weight-percent chromium oxide and a promoting amount of at least one of niobium oxide and tantalum oxide.

5. The method of claim 1 wherein said hydrocarbon comprises primarily nonaromatic hydrocarbons having about two to about 12 carbon atoms per molecule, said catalyst consists essentially of about 30 to about 95 weight-percent alumina, about 1 to about 50 weight-percent chromium oxide and a promoting amount of at least one member selected from the group consisting of niobium oxide and tantalum oxide, and said dehydrogenation reaction is effected in the presence of added hydrogen for a reaction period of about 0.01 to about 50 seconds.

6. The method of claim 1 wherein said hydrocarbon comprises primarily hydrocarbon molecules having about two to about five carbon atoms, said catalyst consists essentially of an intimate admixture of about 30 to about 95 weight-percent alumina, about 1 to about 50 weight-percent chromium oxide and a promoting amount of at least one of niobium oxide and tantalum oxide, and said dehydrogenative reaction is effected at a temperature of about 900° to about 1,200°F. for a period of at least about 0.1 seconds.

7. The method of claim 1 wherein said hydrocarbon comprises a substantial proportion of paraffinic hydrocarbons having at least about six carbon atoms per molecule in straight chain aliphatic linkage and is contacted at a temperature of about 800° to about 1,200°F. with a catalyst consisting essentially of an intimate admixture of about 30 to about 95 weight-percent alumina, about 1 to about 50 weight-percent chromium oxide and about 0.1 to about 10 weight-percent of at least one of niobium oxide and tantalum oxide.

8. The method of claim 1 wherein said hydrocarbon consists essentially of paraffinic hydrocarbons having about six to about 12 carbon atoms per molecule and said catalyst consists essentially of about 50 to about 85 weight-percent alumina, about 10 to about 40 weight-percent chromium oxide and about 1 to about 5 weight-percent of at least one of niobium oxide and tantalum oxide.

9. The method of claim 1 wherein said hydrocarbon comprises primarily paraffinic hydrocarbons having about six to about 12 carbon atoms per molecule and at least about six carbon atoms in a straight chain paraffinic linkage, said dehydrogenative reaction is effected at a temperature of about 800° to about 1200°F. and a pressure of about 15 to about 200 psia for about 0.1 to about 50 seconds in the presence of about 1 to about 10 moles of hydrogen per mole of said feedstock, said catalyst consists essentially of about 1 to about 50 weight-percent chromium oxide, about 30 to about 95 weight-percent alumina, about 0.1 to about 10 weight-percent of at least one of niobium oxide and tantalum oxide, and about 0.5 to about 15 weight-percent of at least one inhibitor selected from the alkali and alkaline earth metal oxides.

10. The method of dehydrogenatively reacting hydrocarbons containing at least two adjacent paraffinically linked primary and/or secondary carbon atoms including the steps of contacting said hydrocarbon at a temperature of about 800° to about 1,200°F. for a period of at least about 0.1 seconds with a catalyst comprising in combination at least about 30 weight-percent alumina, about 1 to about 50 weight-percent chromium oxide and a promoting amount of at least one of niobium oxide and tantalum oxide.

11. The method of claim 10 wherein said hydrocarbon is contacted with said catalyst in the presence of about 1 to about 10 moles of hydrogen per mole of hydrocarbon.

12. The method of claim 10 wherein said hydrocarbon contains a substantial proportion of at least one hydrocarbon having about six to about 12 carbon atoms per molecule.

13. The method of claim 10 wherein said hydrocarbon contains a substantial proportion of at least one hydrocarbon having about two to about five carbon atoms per molecule.

14. The method of claim 10 wherein said hydrocarbon contains a substantial proportion of at least one reactant selected from non aromatic hydrocarbons having at least about two carbon atoms per molecule.

15. The method of dehydrogenatively reacting at least one hydrocarbon containing at least two adjacent carbon atoms in paraffinic linkage including the step of contacting said hydrocarbon at a temperature of about 800° to about 1,200°F. with a thermally activated catalytic composition prepared by intimately admixing (A) at least one of activated alumina and alumina hydrogels, (B) at least one of chromia hydrogels and water soluble thermally decomposable chromium salts, and (C) at least one of hydrogels and water soluble thermally decomposable salts of at least one member of the group consisting of niobium and tantalum, said mixture being prepared in proportions sufficient to provide a final composition of about 1 to about 50 weight-percent chromium oxide and at least a promoting amount of at least one of niobium oxide and tantalum oxide.

16. The method of claim 15 wherein said hydrocarbon contains a substantial proportion of at least one member of the group consisting of non aromatic hydrocarbons having about two to about 12 carbon atoms per molecule.

17. The method of claim 16 wherein said hydrocarbons are contacted with said catalyst for about 0.01 to about 50 seconds and said catalyst is prepared by admixing (A) an alumina hydrogel produced by contacting an aqueous solution of a water soluble aluminum salt with sufficient base to precipitate said alumina hydrogel, (B) a chromia hydrogel formed by contacting an aqueous solution of a water soluble chromium salt with sufficient base to precipitate the hydrogel, and (C) at least one hydrogel of a member selected from the group consisting of niobium and tantalum formed by contacting an aqueous solution of a water soluble salt of said member with sufficient base to precipitate said hydrogel, and thermally activating the resultant combination.

18. The method of claim 15 wherein said hydrocarbon contains a substantial amount of at least one non aromatic hydrocarbon and said catalyst is prepared by admixing an aqueous solution of aluminum nitrate with sufficient base to coprecipitate a hydrogel of chromia and an oxide of at least one of niobium and tantalum, intimately admixing said last hydrogel and said alumina hydrogel and thermally activating the resultant combination.

19. The method of claim 18 wherein said hydrocarbon is dehydrogenatively reacted over said catalyst in the presence of up to about 30 moles of hydrogen per mole of said hydrocarbon for a period of about 0.1 to about 15 seconds.

20. The method of claim 15 wherein said hydrocarbon comprises primarily hydrocarbons having about two to about five carbon atoms per molecule and said contacting is effected at a temperature of about 900° to about 1,200°F. and a pressure of about 15 to about 100 psia for a period of about 0.05 to about 2 seconds.

* * * * *